United States Patent [19]

Nepela et al.

[11] 3,887,945

[45] June 3, 1975

[54] HEAD ASSEMBLY FOR RECORDING AND READING, EMPLOYING INDUCTIVE AND MAGNETORESISTIVE ELEMENTS

[75] Inventors: Daniel A. Nepela, Saratoga; Robert I. Potter, San Jose, both of Calif.

[73] Assignee: International Business Machines Corporation, Armonk, N.Y.

[22] Filed: Dec. 12, 1973

[21] Appl. No.: 424,242

[52] U.S. Cl. .................................................. 360/113
[51] Int. Cl. ........................... G11b 5/30; G11b 5/12
[58] Field of Search ...... 360/113; 324/46; 338/32 R

[56] References Cited

UNITED STATES PATENTS

| | | | |
|---|---|---|---|
| 3,813,692 | 5/1974 | Brock et al. | 360/113 |
| 3,814,863 | 6/1974 | O'Day et al. | 360/113 |

OTHER PUBLICATIONS

Brock et al., "Magnetoresistive Read/Write Head," IBM Tech. Disc. Bull., Vol. 15, No. 4, Sept. 1972, pg. 1206.

*Primary Examiner*—Bernard Konick
*Assistant Examiner*—R. S. Tupper
*Attorney, Agent, or Firm*—James A. Pershon

[57] ABSTRACT

A head assembly for recording and reading data includes a pair of conductive films having a thin magnetoresistive (MR) element therebetween to achieve reading of magnetically recorded data; and having a pair of outer highly permeable members to accomplish writing of data on a magnetic medium. Control currents are applied to the conductors during each mode to provide the necessary bias for either inductive or magnetoresistive operation exclusively.

13 Claims, 2 Drawing Figures

HEAD ASSEMBLY FOR RECORDING AND READING, EMPLOYING INDUCTIVE AND MAGNETORESISTIVE ELEMENTS

BACKGROUND OF THE INVENTION

1. Field of the Invention

This invention relates to a head assembly that is useful for both reading and writing data on a magnetic medium.

2. Description of the Prior Art

It is highly desirable to use magnetoresistive (MR) elements in head assemblies for sensing recorded data. MR heads are thin and afford a savings in space, may be made by batch fabrication, and are relatively inexpensive when produced in bulk. Furthermore, the signal output of an MR head is substantially larger than that experienced with an inductive head. However, MR heads are limited to reading data, and are not employed for recording data. It would be very useful to have a head assembly which incorporates the features of an MR head, and yet has the ability to provide the recording function.

SUMMARY OF THE INVENTION

An object of this invention is to provide a head assembly that is capable of both reading and writing data on a magnetic medium.

Another object of this invention is to provide a head assembly that obtains a relatively high output signal, and yet does not require a high level of current during the write mode.

In accordance with this invention, a head assembly incorporates an MR element having conductive films on each side. Spaced from the MR element and adjacent to each conductive layer are highly permeable members that will enable inductive recording. A current control circuit is employed to provide the desired bias currents and to establish the necessary magnetic fields to effectuate reading and writing.

BRIEF DESCRIPTION OF THE DRAWING

The invention will be described in greater detail with respect to the drawing in which.

DESCRIPTION OF THE PREFERRED EMBODIMENT

Figure 1:
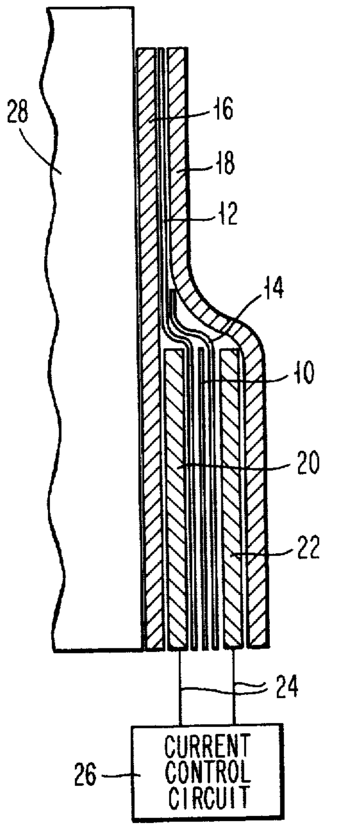
FIG. 1 is a side cross-sectional view of the magnetic head assembly, made in accordance with this invention.
Figure 2:
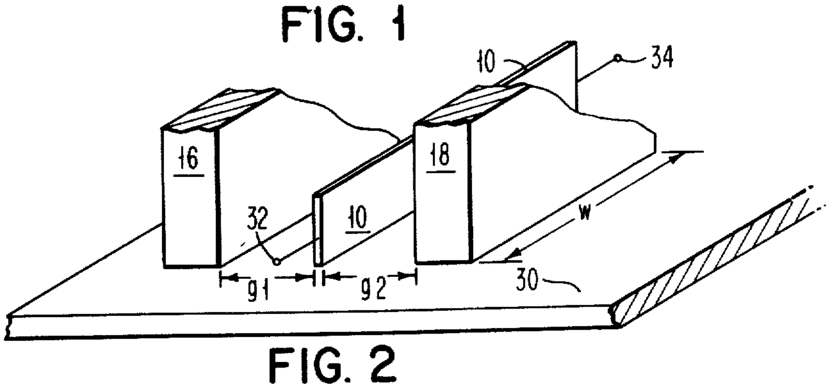
FIG. 2 is a simplified representation indicating the relationships of the two non-magnetic transducing gaps g1 and g2 relative to the MR element of the head assembly and the magnetic storage medium, with some of the layers depicted in FIG. 1 omitted for the sake of clarity.

With reference to FIGS. 1 and 2, a head assembly made in accordance with this invention includes an MR element 10 having insulating members 12 and 14 disposed on each side thereof. The insulating members are extended to provide isolation between two highly permeable and electrically conducting magnetic members 16 and 18, which may be made from Permalloy, that enclose the assembly. Although electrically insulated, the magnetic reluctance between layers 16 and 18 in the back gap region is held low by suitable choice of dimensions. Alternatively, the back gap can be closed if one of the permeable members 16 or 18 is an insulating ferrite material. In such case, the member 16 or 18 and the substrate 28 are one and the same material. Between the insulating members 12 and 14 and the magnetic members 16 and 18, conductive films 20 and 22, which may be made from copper, are deposited. Electrical leads 24 are attached to the exposed ends of the conductors 20 and 22 and are coupled to a current control circuit 26. The MR element includes conductive portions, such as copper, at its ends, to which are attached electrical leads 32 and 34 to provide a means for sensing the resistance of the element. The assembly may be formed by evaporation techniques or other known methods on the substrate 28. In this preferred embodiment, the MR element is centrally disposed between the Permalloy members to ensure that a symmetric pulse is obtained during readout.

During the read mode, the current control circuit 26 supplies direct current of opposite direction but of the same magnitude to the conductors 20 and 22. In this mode, the MR element linearly senses the magnetic flux associated with the signal recorded on the magnetic medium 30, and permeable layers 16 and 18 improve the resolution of the device by making the MR element responsive only to the adjacent portion of the magnetic medium 30. The effective gap length in the read mode is $(g1+g2)/2$. Since the bias currents to the conductors 20 and 22 during the read mode provide a total net current of zero, no external magnetic field exists that will affect the recorded data adversely. The bias DC currents are applied with a predetermined magnitude so that the head assembly operates at the desired operating point along the $\Delta\rho$ versus H curve, where $\Delta\rho$ is the change in resistivity of the MR element.

During the write mode, bias currents from the control circuit 26 are applied in the same direction to the conductors, by reversing the current to one conductor when switching from the read mode. To record data, the currents to the conductors 20 and 22 are pulsed to change direction simultaneously but the currents in both conductors are maintained in the same direction at any given time. The pulsing and change of current direction cause a reversal of the magnetic flux lines and results in the recording of magnetic transitions in the magnetic medium. During the write operation, the presence of the MR element has minimal effect on the write field.

Thus, it is seen, that with the assembly of this invention, during the read mode there is no field set up between the Permalloy members 16 and 18, and therefore writing or erasure of data cannot be accomplished. On the other hand, during the write mode, a fringe field is established between the Permalloy members so that inductive recording may take place.

With the assembly disclosed herein, the signal that is written penetrates deeply into the recording medium, since writing is accomplished across the length of the two gaps g1 and g2. However, analysis shows that reading is accomplished with an effective gap of half such length. With the head assembly of this invention, writing may be accomplished on low coercivity media, in the order of 200-250 oersteds. A corresponding reduction in the remanent moment of the media is desirable to maintain high storage capacity of the media. Although the signal output from such media may be of lower magnitude, because there will preferably be a similar reduction in moment, the MR sensing arrangement provides a higher output signal to compensate for this condition. Alternatively with a greater multiplicity of turns, writing can be accomplished on media of higher coercivity.

It should be noted that the highly permeable members 16 and 18 serve as yokes for the recording head, and also as means for improving the resolution during the read mode. Another feature of this invention is that protective diode circuits are not needed in the readback preamplifier network, because the inherent saturation characteristic of the MR effect limits the output to a safe level during the write mode. Also this assembly lends itself to the use of multi-turn or multi-coil arrangements, which allows lower write currents or media of higher coercivity to be employed. These various advantages are obtained with the compact, relatively inexpensive assembly disclosed herein. Moreover, the width of the recorded track, defined by the width of the Permalloy members 16 and 18, may be made different from the width ($w$) of the MR element, thus effecting the function known as "write wide, read narrow." In a preferred embodiment the MR element has a thickness of 200–500 Angstroms and the Permalloy members would be at least 10–100 times that thickness.

What is claimed is:

1. A head assembly for reading and recording magnetically recorded information on a medium comprising:

a magnetoresistive element;

conductive films having one planar surface of each disposed adjacent to opposite planar surfaces of said magneto-resistive element;

highly permeable magnetic members disposed adjacent to the planar surface of said films opposite said magnetoresistive element;

means for applying an electrical current to said conductive films to selectively provide a bias field for said magnetoresistive element and to selectively provide a periodically reversible current to record magnetic transitions in the medium; and means for sensing the resistance of said magnetoresistive element to read the magnetic information from the medium.

2. A head assembly as in claim 1, wherein said means for applying an electrical current includes control means for varying the direction of current to said conductive films.

3. A head assembly as in claim 1, wherein said current applying means applies D.C. bias current to said conductive films in opposite directions and of substantially equal magnitude during a read mode.

4. A head assembly as in claim 1, wherein said current applying means applies a current to said conductive films in the same direction at any given time, said current being periodically reversed to record transitions in a medium.

5. A head assembly as in claim 1, including insulating members disposed between said magnetoresistive element and said conductive films.

6. A head assembly as in claim 1, wherein said magnetic members and said magnetoresistive element are of different widths.

7. A head assembly as in claim 1 including a substrate, wherein one of said highly permeable magnetic members is made of Permalloy, and the other of said permeable magnetic members is made of an insulating ferrite formed with said substrate.

8. A head assembly as in claim 1, wherein said magnetic members are made of Permalloy layers.

9. A head assembly as in claim 8, wherein the thickness of a Permalloy layer is several times that of said magneto-resistive element.

10. A multilayer head assembly for reading and recording magnetically recorded information on a medium comprising:

a layer of a magnetoresistive material for sensing magnetically recorded information while transversing the medium, a pair of layers of electrically conductive film material, one planar surface of each layer disposed adjacent to opposite planar surfaces of said magnetoresistive layer; and a pair of highly permeable magnetic members, one disposed adjacent to each planar surface of said pair of conductive film layers opposite said magnetoresistive layer;

selectively controllable means connected to said conductive film material to provide a bias field for said magnetoresistive element and to provide a periodically reversible magnetic field to record magnetic transitions in the medium.

11. A head assembly as described in claim 10 wherein said selectively controllable means includes a means for applying a unidirectional bias electrical current to each of said conductive film layers in opposite directions and of substantially equal magnitude during a read mode.

12. A head assembly as described in claim 10 including insulating layers disposed between said magnetoresistive layer and said conductive film layers.

13. A head assembly as described in claim 10 wherein the thickness of the magnetic members is several times that of said magnetoresistive layer.

* * * * *